United States Patent [19]

Wilcox et al.

[11] Patent Number: 5,685,553
[45] Date of Patent: Nov. 11, 1997

[54] SUSPENSION FOR A BICYCLE HAVING A Y SHAPED FRAME

[75] Inventors: Weston M. Wilcox, Sun Prairie; Matthew A. Rhoades, Madison; Michael L. Zeigle, Sun Prairie, all of Wis.

[73] Assignee: Trek Bicycle Corp., Waterloo, Wis.

[21] Appl. No.: 401,186

[22] Filed: Mar. 9, 1995

Related U.S. Application Data

[63] Continuation-in-part of Ser. No. 28,727, Sep. 21, 1994, Pat. No. Des. 368,678.

[51] Int. Cl.⁶ .................................................. B26K 3/02
[52] U.S. Cl. ................... 280/283; 280/281.1; 280/288.3
[58] Field of Search ...................... 280/275, 281.1, 280/283, 284, 285, 286, 288, 288.3; D12/111; 384/456, 458

[56] References Cited

U.S. PATENT DOCUMENTS

| | | |
|---|---|---|
| D. 364,365 | 11/1995 | Lin et al. ........................ D12/111 |
| 392,523 | 11/1888 | Owen . |
| 398,158 | 2/1889 | Jeffery . |
| 439,095 | 10/1890 | Becker . |
| 450,705 | 4/1891 | Surbridge . |
| 463,710 | 11/1891 | Mathews . |
| 465,599 | 12/1891 | McGlinchey . |
| 470,317 | 3/1892 | Burton . |
| 519,855 | 5/1894 | Whitaker . |
| 634,340 | 10/1899 | Harnett . |
| 739,237 | 9/1903 | Travis . |
| 1,016,042 | 1/1912 | Shelton . |
| 1,047,430 | 12/1912 | Michaelson . |
| 1,047,431 | 12/1912 | Michaelson . |
| 1,075,886 | 10/1913 | White . |
| 1,120,111 | 12/1914 | White . |
| 2,681,235 | 6/1954 | Seddon . |
| 2,756,071 | 7/1956 | Riva . |
| 3,301,575 | 1/1967 | Ryan et al. . |
| 3,877,539 | 4/1975 | Tilkens . |
| 3,982,770 | 9/1976 | Satoh et al. . |
| 4,087,109 | 5/1978 | Davis ........................ 280/284 |
| 4,169,512 | 10/1979 | Ishikawa et al. . |
| 4,378,857 | 4/1983 | Andersson . |
| 4,744,434 | 5/1988 | Miyakoshi et al. . |
| 4,789,174 | 12/1988 | Lawwill . |
| 4,856,801 | 8/1989 | Hollingsworth ................ 280/284 |
| 5,121,937 | 6/1992 | Lawwill . |
| 5,217,241 | 6/1993 | Girvin ........................ 280/284 |
| 5,226,674 | 7/1993 | Buell et al. .................... 280/284 |
| 5,244,224 | 9/1993 | Busby ........................ 280/284 |
| 5,332,246 | 7/1994 | Buell . |
| 5,335,929 | 8/1994 | Takagaki et al. . |
| 5,356,165 | 10/1994 | Kulhawik et al. ............. 280/284 X |
| 5,415,423 | 5/1995 | Allsop et al. ............... 280/281.1 |
| 5,460,396 | 10/1995 | Sutter et al. . |
| 5,474,318 | 12/1995 | Castellano ................... 280/284 |

FOREIGN PATENT DOCUMENTS

| | | |
|---|---|---|
| 936432 | 7/1948 | France . |
| 446263 | 3/1949 | Italy . |
| 149835 | 1/1991 | Taiwan . |

OTHER PUBLICATIONS

Scott Nicol, GADGETS, VeloNews, vol. 22, No. 9–15, Seven Part Series, *Demystifying dual–suspension systems.*

*Primary Examiner*—Victor E. Johnson
*Attorney, Agent, or Firm*—Lee, Mann, Smith, McWilliams, Sweeney & Ohlson

[57] ABSTRACT

A suspension for a bicycle having a unified rear triangle pivotably connected to a Y shaped frame. The unified rear triangle provides a fixed chain length, isolating rear wheel movement from pedaling motion. A shock absorbing means is connected to the Y shaped frame at the intersection of the arms of the frame and to the rear triangle. A pivot is preferably connected near the bottom bracket of the bicycle in order to reduce movement of the bottom bracket.

16 Claims, 5 Drawing Sheets

SUSPENSION FOR A BICYCLE HAVING A Y SHAPED FRAME

This is a continuation-in-part application of a previously filed application, Ser. No. 29/028,727 filed on Sep. 21, 1994, now U.S. Pat. No. Des. 368,678.

BACKGROUND OF THE INVENTION

This invention is generally related to bicycles, and is specifically related to a rear suspension system for a bicycle having a Y shaped frame.

DESCRIPTION OF PRIOR ART

Bicycles are not commonly equipped with shock absorbers. The extra weight, cost, complexity and often unusual appearance typically cannot justify the added performance benefits. Instead, cyclists rely primarily on the inherent characteristics of the wheels, forks, handlebars, frames, seat posts and saddles of the bicycle to take the edge of bumps. Each of these components contributes a small, but somewhat useful level of flexibility.

Notwithstanding, increased popularity in off-road cycling, particularly on mountains and cross-country, has made a shock absorption system in many instances a biking necessity. A bicycle with a properly designed suspension system is capable of traveling over extremely bumpy, uneven terrain and up very steep inclines. These bicycles are less punishing, reducing fatigue and likelihood of injury to the rider, and are much more comfortable.

Moreover, the number of bicycles factory equipped with suspension systems has dramatically increased. In fact, now, many bicycles come fully suspended, that is, having both a front and rear suspension. Front suspensions were the first to become popular. Designed to remove the pounding to the bicycle front end, the front suspension is simpler to implement than a rear suspension and is easily retrofitted. On the other hand, a rear suspension will increase traction, assist in cornering and balance the ride.

Unfortunately, most prior art rear suspension systems suffer from being too heavy, and often complex. Worse yet, available rear suspensions react to pedaling forces by raising or lowering the rider with every pedal stroke ("pogoing"), or by causing the crank arms to slow or quicken every time the rear wheel hits a bump and compresses the suspension ("biopacing"). In short, rear suspensions consume too much pedaling energy.

Available rear suspension systems are generally categorized into one of three categories: the low pivot, the high pivot and the multiple pivot. U.S. Pat. No. 5,217,241 discloses, for example, a low pivot rear suspension. Here, a single pivot is located relatively close to the line of the top run of the chain, slightly ahead of the front derailleur, and well above the bottom bracket. Designed to have a soft response on small bumps and a strong response on big bumps, low pivot rear suspensions do not neutralize the effect of the chain's tension on the suspension. Therefore, some pogoing and biopacing results.

Similarly, the high pivot rear suspension generally has a single pivot. Here, the pivot is positioned high above the chain and front derailleur. Although of simple construction, the high pivot rear suspension has a lot of drawbacks. First, the rear wheel does not move at a right angle to the chain force. Second, a stiff spring with lots of preload must be used in order to minimize the pogoing and biopacing. And third, this shock absorption system will not absorb small bumps and is often harsh on large ones.

In contrast to both high and low rear suspensions, the multiple pivot rear suspension typically has three or four pivots between the seat tube, seat stay, and the chain stay. Every pivot is typically positioned well above the bottom bracket. At each pivot, pivoting movement involves a certain amount of "play" or movement in an unwanted direction. Each pivot presents a weak point with some play. And the magnitude of play is typically multiplied by the greater number of pivots involved. Hence, the more pivots, the greater loss of energy and directional control. Also, since the multiple pivot suspension has lots of joints, wear is problem. Multiple pivot rear suspensions are illustrated by example in U.S. Pat. Nos. 4,789,174 and 5,244,224.

Available rear suspensions all share one basic problem, the position of the pivot(s). The pivot is commonly spaced from the bottom bracket. Usually the pivot is placed well above the bottom bracket. Hence, the bottom bracket moves. The movement of the bottom bracket relative to the pivot is in the form of an arc. This unwanted motion interferes with the natural pedaling motion, creating loss of energy to the cyclist.

Another common problem is rear wheel movement and the effect it has on pedaling. With prior art rear suspensions, the bottom bracket and rear axle are not rigidly fixed or rigidly connected, that is, rotatably carried at opposite ends of a structure having a fixed length. Pivoting between the chain stay and seat tube and/or seat stay creates motion between the rear axle and the bottom bracket. Moreover, as the chain is pulled, the rear wheel moves, either in a direction perpendicular to the chain or rearwardly at an angle. This rear wheel movement transfers to the bottom bracket. Prior art rear suspension systems do nothing to isolate the rear wheel movement from normal pedaling motion, creating yet another source of pedaling interference.

A need exists, therefore, for a rear suspension system which minimizes movement of the bottom bracket relative to the rear wheel and isolates rear suspension travel and rear wheel movement from normal pedaling motion.

SUMMARY OF THE INVENTION

The subject invention is a suspension system for a bicycle comprising a Y shaped frame, a unified rear triangle, and a shock absorber connected between the Y shaped frame and the unified rear triangle. The unified rear triangle is secured in a pivotal relation to the Y shaped frame. The Y shaped frame has a head leg, a seat arm and a down arm. The top arm and down arm are secured in a spaced relation to one another, extending rearwardly from the head leg. The top and down arm converge at an intersection. The shock absorber is connected to the Y shaped frame at the intersection between the arms of the frame.

The Y shaped frame has advantages in ease of manufacture, strength, weight and aerodynamic shape. The Y shaped frame increases standover clearance and lowers the center of gravity. The preferred frame of the subject invention is the Y shaped frame, however, other frame designs may be used to accomplish the above objectives.

The unified rear triangle of the subject invention comprises a top stay, a chain stay and a mount brace. The top stay is connected at one end to the chain stay and diverges in a spaced relationship to the chain stay. The mount brace extends between and interconnects the top stay and chain stay. A bicycle bottom bracket is mounted on the rear triangle between the chain stay and the mount brace for connecting bicycle crank arms to the rear triangle. In the preferred embodiment, right side and left side pairs of stays define a fork in which the rear wheel is held. Cantilevered stay arrangements are also feasible and do not depart from the scope of the present invention. In the preferred embodiment, the apexes or ends of the top and chain stays of the rear triangle are fitted with slotted drop-outs for fixing a typical rear wheel axle of the bicycle therebetween.

The term "triangle" is commonly used to refer to the rear wheel supporting frame of a bicycle. Hence, the scope of the present invention covers any one piece arrangement spacing the locations of the bottom bracket tube, rear axle mount, shock absorber connector and pivot (spaced between the bottom bracket and the shock absorber). Indeed, the bottom bracket tube, rear axle mount, shock absorber connector, in effect, define the triangle, even if the physical structure does not look like the preferred embodiment "triangle."

The unified rear triangle of the present invention is rigidly connected. Movement between the rear axle and bottom bracket is eliminated. The distance between the bottom bracket and the center or axis of rotation of the rear axle of the bike does not change upon pedaling. The chain length (as defined by the distance between the center of the bottom bracket and the center, or axis of rotation of the rear axle) is fixed. Hence, up and down rear wheel motion is obstructed. Rotational force imparted by the rider on the pedals is directly transmitted into forward rear wheel rotation.

By employing the subject invention, travel by the rear axle of the bicycle wheel is controlled by the shock absorber. There is no reverse torque effect on hitting a bump. The crank arms do not slow or quicken every time the rear wheel hits a bump and compresses the suspension. Hence, no biopacing occurs. Furthermore, pedaling does not cause the rear suspension to move. There is no pedal-induced shock activation, or pogoing. The rear wheel acts independently of the frame, providing a fully active rear suspension.

The unified rear triangle is preferably made of welded aluminum, designed to swing on a suitable, preferably composite bearing and an aluminum rear axle. With this design, the cyclist feels cradled between the wheels and is insulated from bumps better than ever before. No longer must the cyclist fight the pedals over washboard or stutter bumps. A spin is unimpeded, just as on a rigid bike, no matter what the terrain.

The unified rear triangle is secured in a pivotal relation to the Y shaped frame. In the preferred embodiment of the present invention, a pivot is connected to the end of the down arm of the Y shaped frame and on the rear triangle, immediately above, close to but slightly ahead of the bottom bracket. Another desirable feature is that the distance from the point of pivoting to the bottom bracket is small. Locating the pivot in this manner provides a neutral position for the bottom bracket. Both horizontal and vertical components of travel of the bottom bracket are reduced, as is the overall motion of the bottom bracket upon pedaling.

The combination of the subject invention, a one piece Y shaped frame pivotably connected to a unified rear triangle, allows the cyclist to ignore many of the off road obstacles that usually cause problems. Rear wheel movement is isolated, with no effect on pedaling motion. Moreover, by locating the pivot close to the bottom bracket, movement of the bottom bracket upon pedaling is reduced. This means an improved, faster ride while feeling much more comfortable.

It is an object and feature of the present invention to provide a new and useful suspension system for a bicycle.

It is another object and feature of the present invention to provide a new, original and ornamental design for a bicycle frame.

It is a further object and feature of the present invention to provide a rear suspension system design which reduces the movement of the bottom bracket.

It is yet another object and feature of the present invention to provide a bicycle with a suspension system designed to isolate rear wheel movement from normal pedaling motion. These and other objects and features of the invention will be readily apparent from the accompanying drawings and detailed description of the preferred embodiment. All references, applications and patents cited are incorporated herein in their entirety.

DETAILED DESCRIPTION OF THE PREFERRED EMBODIMENT

The subject invention is illustrated in a single preferred embodiment as shown in FIGS. 1 through 10. The present invention is a suspension 10 for a bicycle comprising a Y shaped frame 12, a unified rear triangle 14, and a shock absorber 44 connected between the frame 12 and the unified rear triangle 14. The unified rear triangle 14 is secured in a pivotal relation to the Y shaped frame 12.

The Y shaped frame 12 has a head leg 18, a seat arm 20 and a down arm 22 diverge outwardly from a center or apex portion at intersection 24. The seat arm 20 and down arm 22 extend rearwardly from the head leg 18. The shock absorber 44, or other suitable spring means is connected to the Y shaped frame 12 at the intersection 24 between the arms 20, 22 of the frame 12.

As shown with particularity in FIGS. 2 through 7, the preferred Y shaped frame 12 has an aerodynamic design. The frame 12 is designed to increase standover clearance, lower the center of gravity and provide an attractive appearance. The Y shape optimizes the performance of bicycles that are fully suspended, having both a front suspension 5 and rear suspension 10, such as the bicycle 150 shown in FIG. 1. Moreover, as described herein, the Y shaped frame 12 is an important component of the suspension system 10 of the present invention.

In the preferred embodiment, the Y shaped frame 12 is a one piece, molded frame. The frame 12 is made of OCLV (optimum compaction low void) carbon fiber reinforced plastic comprising laminated unidirectional carbon fiber in an epoxy matrix optimally compacted to create a low void (a fiber volume of greater than sixty percent (60%)) between laminations. This stiff, strong, lightweight material is described in detail in pending U.S. patent application Ser. No. 08/134,916 assigned to Trek Bicycle, Corp. which is a divisional application of the parent application Ser. No. 07/890,933, now abandoned. The method is described in U.S. patent application Ser. No. 08/192,255, also assigned to Trek Bicycle, Corp. There is a common inventor between the subject invention and these cited applications.

Alternatively, the frame 12 may be made from materials that are known to those skilled in the art including, but not limited to, any one of a wide variety of metals such as aluminum, titanium, magnesium, and boron, or ceramic, plastic, or other polymeric substances such as epoxy resins, non fibrous or fibrous materials, or combinations thereof such as in composites where fiber reinforcements are contained in a plastic or metal matrix. The frame of the subject invention may be welded, molded, thermoset, laminated or simply bolted together. Welded aluminum has been found to be a suitable alternative frame material and is expected to have a commercially feasible use.

The spacing of the ends of arms. 20, 22 from one another not only provides clearance for the rear triangle 14 and shock absorber 44, but also allows a considerable space for a retracted, but long, seat post 27 highly desirable in a mountain bike to maximize rider position options on level and inclined surfaces. It will be noted in connection with FIG. 1, the preferred Y shaped frame 12 is arranged so that the arms 20 and 22 are both of substantially (but not precisely) equal length and they diverge from the longitudinal axis of the head leg 18 at substantially (but not precisely) equal angles. Other embodiments could have arms of less symmetric arrangement.

Where an all composite frame 12 has been used, it has been found advantageous to use metal sleeves in various places. Thus seat arm 20 may have a sleeve to support seat post 27. Head leg 18 may use a metal sleeve where the headset 29 passes therethrough. These allow wear points to be reinforced and to spread point loads as may be cause by the typically metal components 27, 29 so the integrity of the all composite frame 12 is not compromised. Nevertheless, an all composite frame can be made strong enough, and certain hybrids such as Kevlar cloth can provide impact resistance greater than that of carbon fibers.

The unified rear triangle 14 of the present invention comprises a top stay 26, a chain stay 28 and a mount brace 30. The top stay 26 is secured in spaced relation to the chain stay 28. The brace 30 extends between and interconnects the top stay 26 and chain stay 30. A bottom bracket tube 32 is preferably (and typically) positioned with the rear triangle 14 between the brace 30 and the chain stay 28. Hence, there is a fixed distance between the bottom bracket tube 32 and a rear axle 34 of a bicycle wheel 36. In the preferred embodiment, the top stay 26, chain stay 28 and brace 30 are welded together. Alternatively, other ways of securing the top stay 26, chain stay 28 and brace 30 may be employed including but not limited to, molding the rear triangle 14 in one or more hollow pieces or adhesively bonding, brazing or bolting the components 26, 28, 30 of the rear triangle 14 together. The rear triangle 14 is preferably made of 6061 T6 aluminum (one of several alloys commonly used in structural components, often referred to as "aircraft aluminum") to create a rear triangle 14 which is light and extremely stiff. Other suitable materials include, but are not limited to, molding in composite materials previously described for the "Y" frame.

A fork (not shown) is defined where a right side pair 110 of chain and top stays 26, 28 is connected to a left side pair (not shown) of chain and top stays (not shown) in which the rear wheel 36 of the bicycle 150 is held. Cantilevered stay arrangements are feasible and do not necessarily depart from the invention. As shown clearly in FIG. 9, in the preferred embodiment, the apexes 112, 114 of the top and chain stay 26, 28 of the rear triangle are preferably fitted with slotted a drop-out for fixing a typical rear wheel axle 34 therebetween. It will also be noted that the top stay 26 in the preferred embodiment is substantially lined up with the axis of head leg 18. Other embodiments could accomplish the functions described herein, however, this embodiment is preferred.

As previously mentioned, the term "triangle" is often used to refer to any bicycle rear wheel supporting frame. For example, in the suspension system of the subject invention, the location of the bottom bracket tube 32, rear axle mount 112, shock absorber connector 48 form the apexes of a triangle. The triangle can be thought of as having three sides: a first side running between the bottom bracket tube and the shock absorber connector, a second side running between the bottom bracket tube and the rear axle mount, and a third side running between the shock absorber connector and the rear axle mount. The pivot, spaced adjacent to the first side of the triangle, is included within an angle defined by a line extending from the second side and a line extending from a third side.

Hence, alternative embodiments of the suspension of subject invention may be applied to bicycles generally. In these instances, the Y shaped frame 12 may be considered, or redefined, as a first frame (not necessarily Y shape) and the unified rear triangle 14 may be redefined as a second frame where the second frame of any articulated bicycle can be defined by its bottom bracket tube, its rear axle and a shock absorber connector. In this event, the suspension system of the subject invention comprises a first frame, a second frame and a shock absorber mechanism.

Moreover, the first frame includes a first mounting member (commonly referred to as the head tube) adapted to rotatably connect the front wheel of the bicycle to the first frame, a first connector member (comparable to the down arm 22 of the preferred embodiment) and a second connector member (comparable to the shock absorber connector 46 of the preferred embodiment) spaced apart from the first connector member. The second frame includes a second mounting member (comparable to the rear axle mount 112) adapted to rotatably connect the rear wheel 36 of the bicycle to the second frame, a third mounting member (comparable to the bottom bracket tube 32) adapted to rotatably connect the pedals of the bicycle to the second frame, a third connector member (comparable to the pivot 40) and a fourth connector member (comparable to the shock absorber connector 48).

Hence, in possible alternative embodiments, the third connector member is located at a first distance from the third mounting member. The fourth connector member is located at a second distance from a third mounting member. The second distance being greater than the first distance. The third connector member is pivotally attached to the first connector member of the first frame. The shock absorbing mechanism has a first end connected to the second connector member of the first frame, and a second end connected to the fourth connector member of the second frame. Similar to the preferred embodiment, the shock absorbing mechanism enables the first frame and the second frame to pivot relative to one another. It is also possible that the third connector member be located generally between the third mounting member and the fourth connector member.

Figure 8:
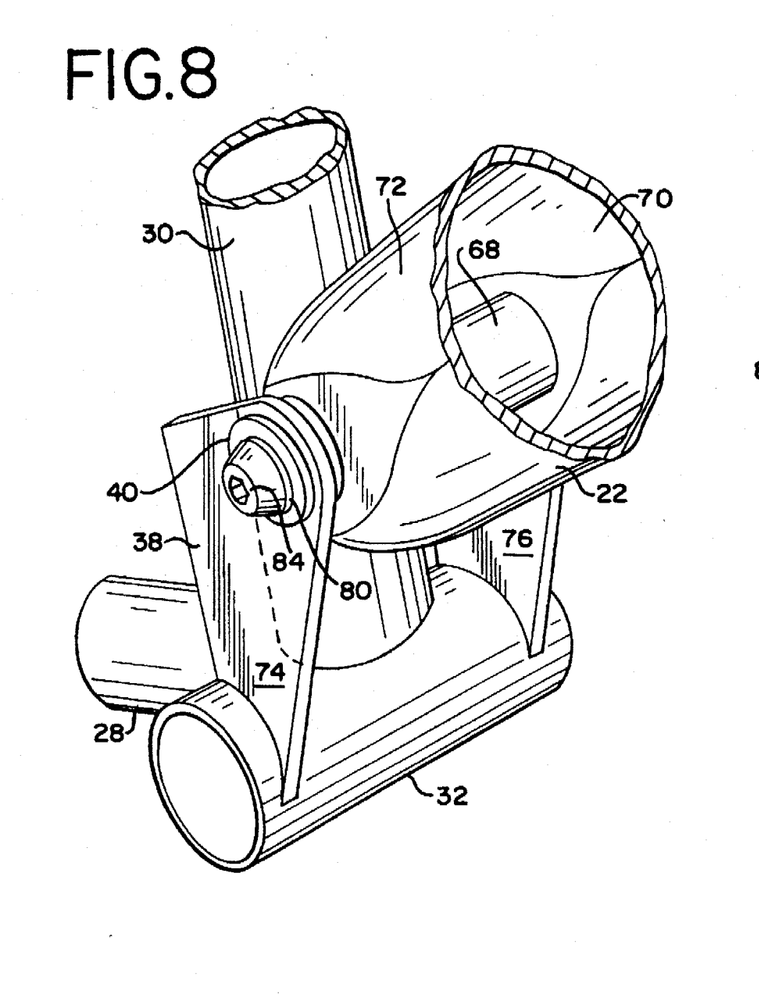
FIG. 8 is a perspective view of the pivot of the subject invention.

Returning to the preferred embodiment, the unified rear triangle 14 is secured in a pivotal relation to the Y shaped frame 12. As shown in FIG. 8, a pivot plate arrangement 38 is connected to the end of the down arm 22 of the Y shaped frame 12 at a pivot 40 and attached to the brace 30 of rear triangle 14, immediately above the bottom bracket tube 32. In the preferred embodiment, both the rear triangle 14 find Y shaped frame 12 feature Teflon impregnated composite bearings, described more particularly in connection with FIG. 11, that are bonded in and require no maintenance or lubrication. The distance from pivot 40 along brace 30 to the bottom bracket tube 32 is small—about three and one half inches (3½") in the preferred embodiment with a bottom bracket for twenty-six inch (26") wheels.

Further, in an unloaded condition, the pivot 40 is located substantially vertically above the bottom bracket and the normal rider's center of gravity, approximately at, or a little forward of, the nose of seat 42. This geometry, including both the close vertical spacing and the negligible horizontal spacing is thought superior in that it provides consistent behavior over substantially the entire range of motion rather than compromising certain situations or attempting progressive spring rates. The preferred embodiment, using the close pivot-bottom bracket spacing permits maximum vertical travel of the rear wheel of about between three and one quarter inch to four inches, depending primarily on the shock absorber travel and linkage.

Figure 9:
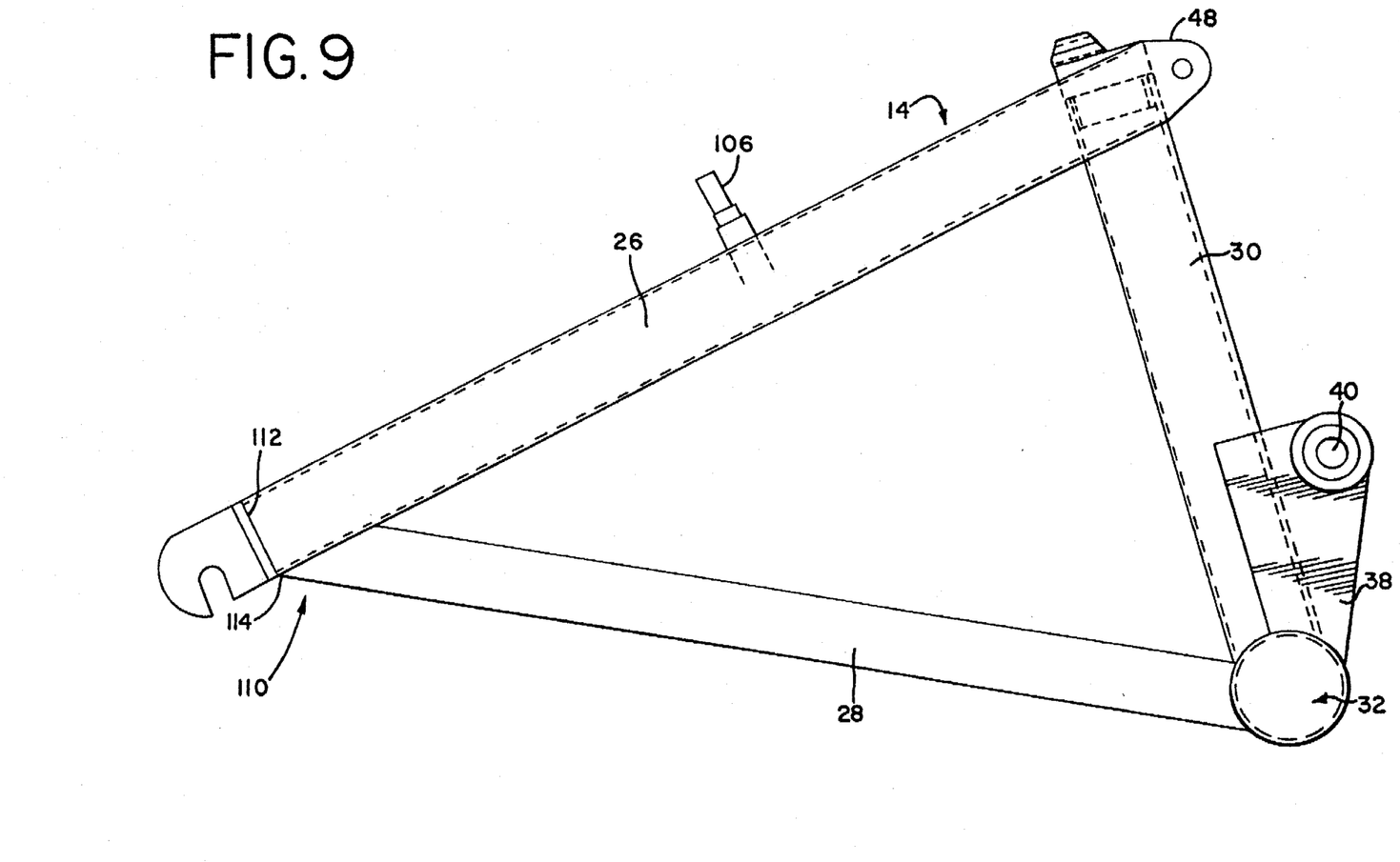
FIG. 9 is a side elevation of the unified rear triangle of the suspension system of the subject invention.

As shown in FIGS. 8 and 9, the pivot plate arrangement 38 is preferably welded to the rear triangle 14. However, the pivot plate arrangement 38, supporting pivot 40 may be attached to the rear triangle by other means such as mechanical fastening, adhesive bonding or the forming of a substantially one piece rear triangle in the manner of the frame 12.

Figure 10:
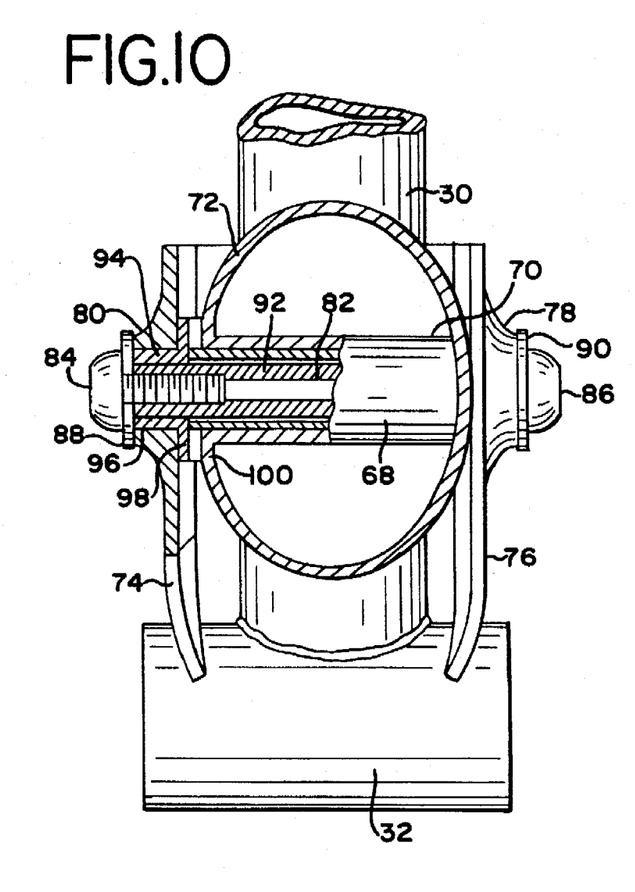
FIG. 10 is a sectional view of the pivot of the subject invention.

The pivot plate arrangement 38 is preferably made as shown and described in FIG. 8 and FIG. 10. Other suitable pivot plate 38 arrangements include, one piece formed plate with two ear portions, molded or cast material or even mechanical fastening, however the structure shown is preferred as optimizing strength, economy and ease of manufacture while minimizing weight and complexity.

As shown in the figures, a shock absorbing means 16 comprises a shock absorber 44 and a first and second shock absorber connectors 46, 48. The shock absorber 44 is preferably connected to the rear triangle 14 at the top of brace 30 by the second shock absorber connector 48 and is connected to the intersection 24 of the Y shaped frame 12 by a first shock absorber connector 46. One of each of the connectors 46, 48 also attaches to one of each of the ends 50, 52 of the shock absorber 44. The preferred shock absorber 44 is a air/oil design commercially available and known by the trademark and trade name "Fox ALP 4." However, other types of shock absorbers or springs may be also utilized such as spring loaded, pneumatic, oil damped, elastomeric, friction or combinations of these.

The shock absorber connectors 46, 48 are preferably made of the same material as the frame 12 and rear triangle 14, respectively. They are preferably connected by welding the second connector 48 to the rear triangle 14 and molding the connector 46 integrally with the Y shaped frame 12. First connector 46 could also be separately molded and bonded to the frame 12 and could advantageously utilize metal reinforcements or bushings at wear points as molded plastic, while strong in tensile strength, is not that resistant to frictional wear or impacts.

Figure 1:
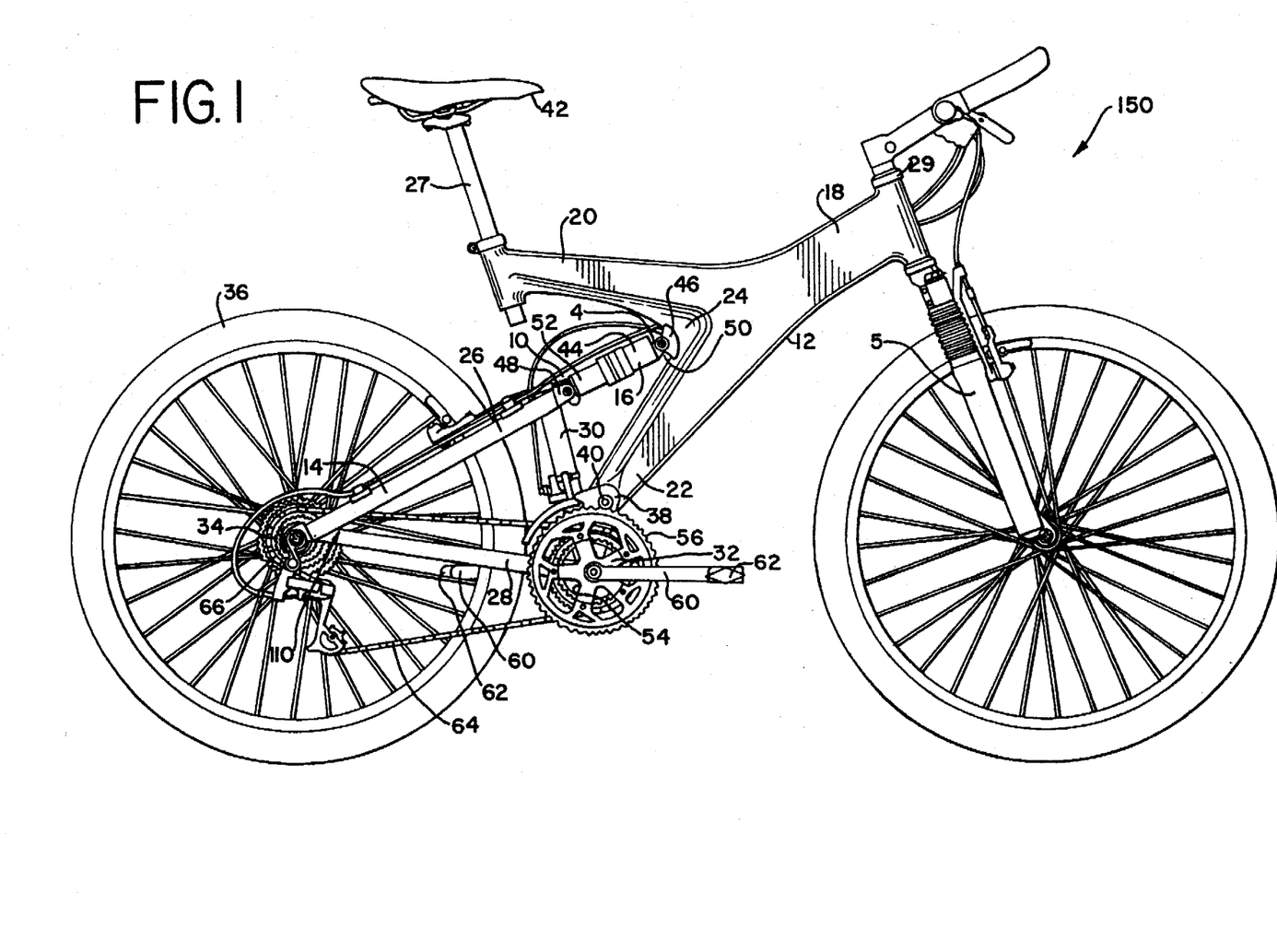
FIG. 1 is a right side elevational view of a bicycle showing the ornamental design of the Y shaped frame and also showing the suspension system of the subject invention.
Figure 2:
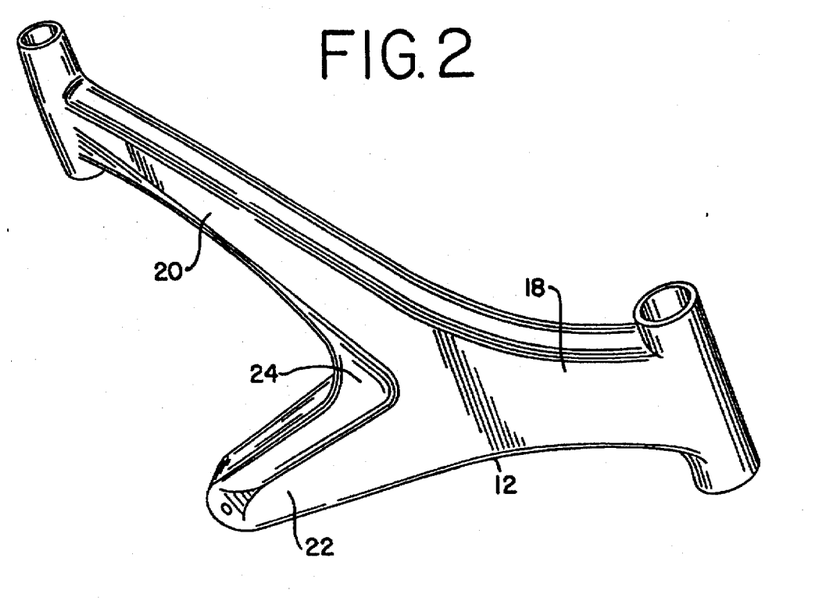
FIG. 2 is a top plan view of the Y shaped frame of the subject invention.
Figure 3:
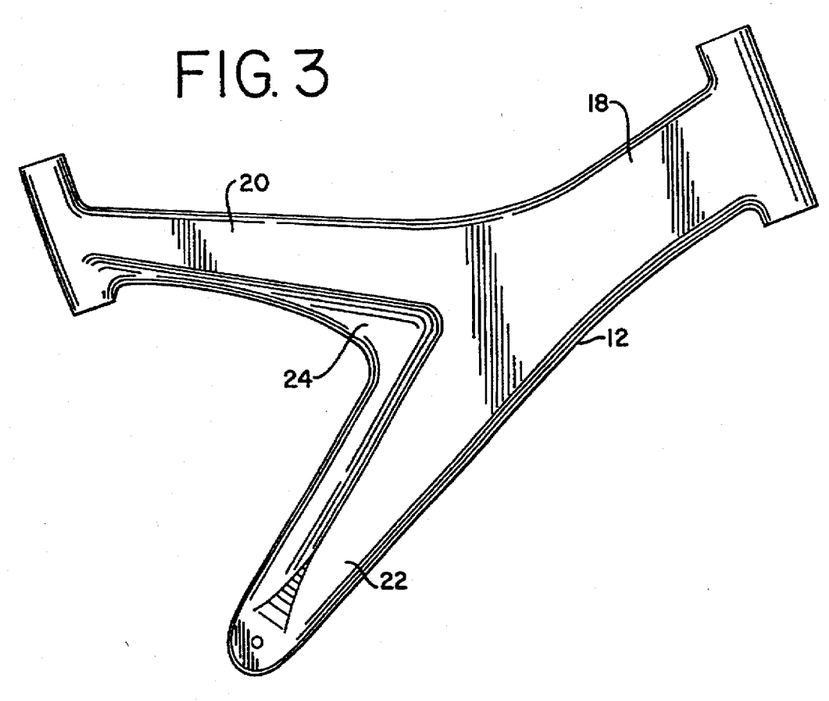
FIG. 3 is a right side elevational view of the Y shaped frame of the subject invention.
Figure 4:
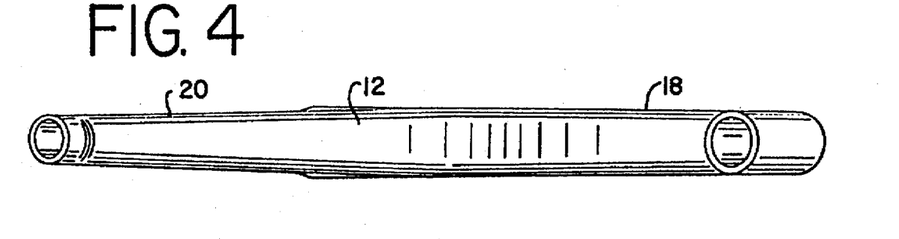
FIG. 4 is a top plan view of the Y shaped frame of the subject invention.
Figure 5:
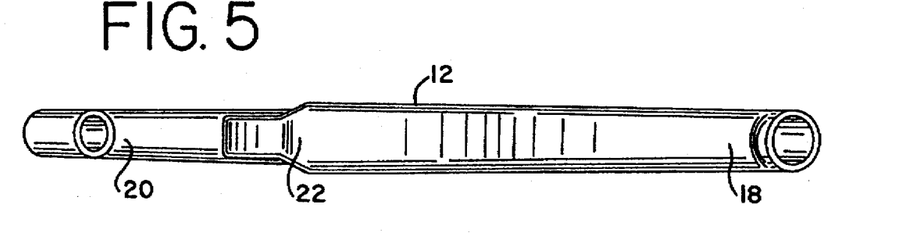
FIG. 5 is a bottom plan view of the Y shaped frame of the subject invention.
Figure 6:
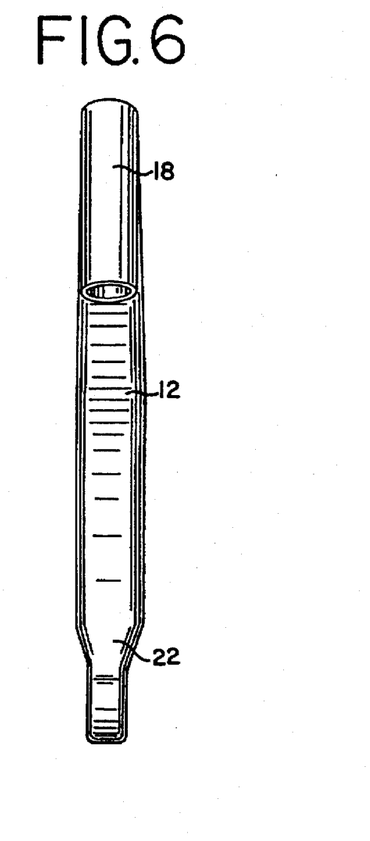
FIG. 6 is a front end view of the Y shaped frame of the subject invention.
Figure 7:
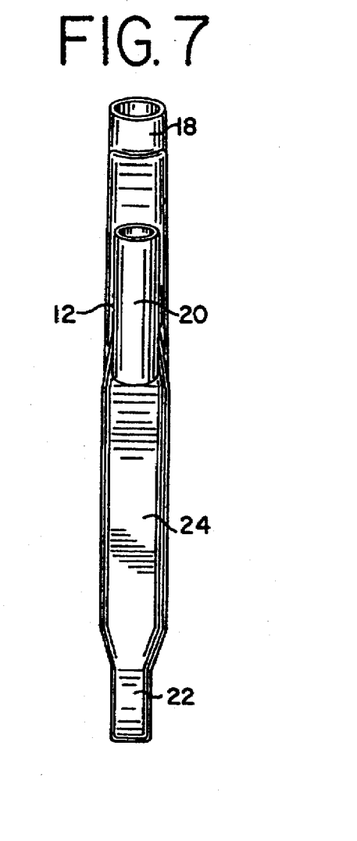
FIG. 7 is a back view of the Y shaped frame of the subject invention.

FIG. 8 is a perspective view of the pivot, with down arm 22 of frame 12, brace 30 and the visible chain stay 28 cutaway to illustrate the structure. Brace 30 is preferably a tube and it has been found that a circular section is suitable. This section permits mounting of standard front derailleurs for shifting. Bottom bracket tube 32 is also an aluminum tube permitting rotatable mounting of bottom bracket assembly 54. As shown in FIG. 1, bottom bracket assembly 54 includes typical bicycle components including multiple chainwheels 56, pedal crank arms 60 and pedals 62. These drive chain 64 and rear sprocket 66 to rotate wheel 36 about axle 34.

Returning to FIG. 8 and FIG. 10, down arm 22 is molded and fitted with a cross tube 68 extending across opposite walls 70, 72 to bear compressive loads from fitting pivot 40 and strengthen arm 22 under side loads. In the preferred embodiment this is formed of similar material to the fiber reinforced plastic of frame 12 as one or more separate pieces. Arm 22 is then cut or drilled, the tube 68 fitted and then bonded in place. This permits the use of the preferred bladder molding technique for the main structural elements of frame 12 and efficient forming and placement of tube 68 to support localized stress.

The connection between brace 30 and bottom bracket tube 32 is reinforced by side plates 74 and 76 which additionally provide for the actual location for pivot 40 without interfering with the straight run of brace 30 and enable the necessary distance of travel for superior suspension operation. Plates 74 and 76 are bored or drilled for the mounting of the pivot pin assembly, as described below.

The edges of the plates are curved or cupped inwardly so that nearly a box section may be formed, leaving only enough clearance for the pivoting and providing greater strength, protection of the pivot itself from the elements and a more pleasing appearance. Each side plate 74, 76 has circular boss 78, 80 welded thereto. Adequate formation of the plates could be accomplished using methods such as stamping, molding or casting to dispense with a separate boss, however the present structure is preferred.

FIG. 8 illustrates the preferred elements in pivot 40. These preferred elements are believed to maximize considerations of strength, weight and performance. Other elements may well function adequately, but not as well. Pivot 40 could be made with alternative arrangements including, but not limited to, traditional bushing or bearing arrangements having suitable strength and wear properties. It must be understood however that many alternative arrangements such as, for example, a steel pin in a bronze bushing, may be quite strong but have a serious weight penalty in a bicycle and other disadvantages from the unlubricated, dissimilar metals.

The main structural dement in pivot 40 is pin 82 preferably formed of a high strength, non-ferrous metal tube. A nickel plated aluminum tube has been found advantageous, the aluminum being of light weight and high strength and the plating providing a durable finish, particularly against friction and galling, However, ferrous pins or tubes would have lower cost, high strength, but also higher weight. Other metals such as titanium would be expected to be suitable and have desirable properties. The tube of pin 82 is threaded at both ends to receive bolts 84, 86 tightened against washers 88, 90. Pivoting movement is permitted by the movement of pin 82 in sleeve 92, being contained in cross tube 68. Pin 82 is supported at its ends by special bushings having a "hat" like shape. Bushing 94 has both a cylindrical portion 96 and a disk or washer-like portion 98. The insides of both these portions 96, 98 are coated with a Teflon or Teflon impregnated surface for lubricant free operation. The inside of sleeve 92 has a similar coating. Thus the inside of portion 96 and inside of sleeve 92 bear on pin 82 permitting pivoting operation with minimal friction.

Disk portion 98 also serves as a thrust bushing by bearing against embedded washer 100 thus providing resistance to twisting or sideward loads between the frame 12 and rear triangle 14 with minimal friction between the parts. Both sides of pin 82 are supported by like structures, only one side being cut away in FIG. 10.

Finally, FIG. 9 shows the unified rear triangle 14 in detail. Top stay 26 connects to chain stay 28 at dropout 114. Brace 30 connects to chain stay 26 at bottom bracket tube 32. Top stay 26 connects to mount brace 30 at shock absorber connector 48. Pivot plate arrangement 38 is mounted on brace 30 substantially between bottom bracket tube 32 and shock absorber connector 48. Pivot 40 is spaced somewhat forward of brace 30. Also visible is brake mount 106 which, in the preferred embodiment, spans the pair of top stays so that a brake caliper can be mounted thereon to act on the rear wheel.

While the invention is described in connection with a preferred embodiment, it will be understood that this is not intended to limit the invention to that embodiment. On the contrary, it is intended to cover all changes, alternatives, modifications and equivalents as may be included within the spirit and scope of the invention as defined by the claims. Hence, it must be understood that certain variations of the subject invention can be made without departing from the scope and breath of the invention, and without diminishing its attendant advantages.

We claim:

1. A suspension for a bicycle comprising:
a Y shaped frame comprising a head leg, a seat arm and a down arm, said seat arm and said down arm extending generally divergingly and rearwardly from said head leg, said seat arm and said down arm converge at an intersection;
a unified rear triangle secured in a pivotal relation to said Y shaped frame; and
a shock absorber connected to said intersection at a first connection and said rear triangle at a second connection;
said suspension having a pivot for pivotally securing said rear triangle to said Y shaped frame, said pivot being connected to said down arm and said rear triangle;
said pivot being positioned on said rear triangle spaced between a bottom bracket tube and said second connection.

2. The suspension of claim 1 wherein said rear triangle comprises a top stay, a chain stay and a mount brace, said top stay connected to said chain stay at a rear axle mount, said mount brace extending between and interconnecting said top stay and said chain stay.

3. The suspension of claim 2 wherein said rear triangle further comprises said bottom bracket tube positioned between said mount brace and said chain stay.

4. The suspension of claim 3 further comprising said pivot being connected to said down arm and said mount brace above said bottom bracket tube.

5. The suspension of claim 4 wherein said pivot is affixed to said mount brace.

6. The suspension of claim 4 whereby said bottom bracket tube will move relative to said pivot in the form of an arc.

7. The suspension of claim 2 wherein said top stay, said chain stay and said mount brace of said rear triangle are integrally connected.

8. The suspension of claim 1 said unified rear triangle further comprising: a shock absorber connector, a rear axle mount and a bottom bracket tube defining said unified rear triangle between them;
said unified rear triangle rotating about said pivot;
said pivot being disposed above said bottom bracket tube and below said shock absorber connector.

9. A bicycle frame comprising:
a one piece Y shaped frame having a head leg, a seat arm and a down arm, said seat arm and said down arm integral to and secured in a spaced relation to one another and extending generally rearwardly from said head leg, said seat arm and said down arm converge at an intersection;
said head leg terminating in a fork mount, said seat arm terminating in a seat post mount and said down arm terminating in a rear suspension pivot.

10. The bicycle frame of claim 9 where said Y shaped frame further comprises one piece of molded carbon fiber reinforced plastic formed of a plurality of laminations of unidirectional carbon fiber sheets compacted against one another to have low voids between the laminations.

11. A rear suspension for a bicycle comprising:
a suspension frame, said suspension frame comprising a top stay, a chain stay and a mount brace, said top stay connected in a spaced relation to said chain stay and said mount brace extending between and interconnecting said top stay and said chain stay to form a triangle, said brace being pivotally connected to a bicycle frame at a pivot;
a bottom bracket tube being positioned on said suspension frame at the intersection of said brace and said chain stay, said suspension frame being adapted to support a bicycle wheel at the intersection of said chain stay and said top stay, whereby said suspension frame is adapted to pivot with relation to the bicycle frame, and the bicycle wheel and said bottom bracket tube is adapted to be maintained substantially the same distance from one another;
said bicycle frame being a Y shaped bicycle frame, said Y shaped bicycle frame having a head leg, a seat arm and a down arm all merging together at an intersection and all diverging from said intersection;
said pivot further comprising
a plate connected to said brace and said chain stay and having a first aperture;
said Y shaped bicycle frame having a second aperture; a pin for connecting said plate to said Y shaded bicycle frame;
a first bushing in said first aperture supporting said pin; and
a second bushing in said second aperture supporting said pin so that said pin permits the pivoting of said triangle relative to said Y shaped bicycle frame.

12. The rear suspension of claim 11 wherein said first bushing further comprises:
a cylindrical portion and a disk portion, said cylindrical portion supporting said pin and said disk portion forming a thrust bushing between said plate and said Y shaped frame.

13. The rear suspension of claim 11 wherein said first bushing comprises a metal bushing body; said first bushing body having a first portion adjacent said pin and a non-friction reducing plastic coating on said first portion of said first bushing body adjacent said pin, and said second bushing comprises a metal bushing body; said second bushing body having a second portion adjacent said pin and a non-friction reducing plastic coating on said second portion of said second bushing body adjacent said pin.

14. A rear suspension bicycle having a bicycle wheel movably supported from a frame and a rear suspension having a bottom bracket, a rear axle mount, a first shock absorber connector and a pivot, comprising:

spacing the locations of the bottom bracket, rear axle mount, shock absorber connector such that they form the apexes of a triangle having three sides;

said triangle having a first side running between said bottom bracket and said shock absorber connector, a second side running between said bottom bracket and said rear axle mount, and a third side running between said shock absorber connector and said axle mount;

said pivot being formed in a plate mounted to said first side;

said pivot being included without an angle defined by a first line extending substantially along said second side and a second line extending substantially along said third side, said first line and said second line intersecting at said rear axle mount and diverging therefrom;

said pivot also being located generally along a third line extending vertically from said bottom bracket, and said frame having a rigid generally Y shaped frame having a head leg with a seat arm and a down arm integral therewith and rearwardly diverging therefrom;

said head leg and seat arm and down arm meeting at an intersection;

said down arm having a first end merging with said head leg and seat arm at said intersection and a second end remote from said first end;

said rear suspension being pivotally mounted to said frame at said second end;

said first shock absorber connector being mounted on said rear suspension;

said frame having a second shock absorber connector at said intersection at which a shock absorber is mounted, whereby said rear suspension operates to absorb shocks from a riding surface without transmitting unwanted motion between pedals and a bicycle wheel.

15. The bicycle of claim 14, said frame further comprising:

said head leg having a longitudinal axis;

said Y shaped frame is arranged so that the seat arm and down arm are of substantially equal length and said seat arm and said down arm diverge from said longitudinal axis at substantially equal angles.

16. The bicycle of claim 14, said triangle further comprising:

a brace extending between said first side and said second side;

a pair of top stays extending from said axle mount to said first shock absorber connector with said brace, defining a wheel rotating space between said top stays;

a pair of chain stays extending from said axle mount to said bottom bracket, defining a wheel rotating space between said chain stays;

a pair of cupped plates extending forwardly and from either side of said brace;

said pivot being located on said plates.

* * * * *

UNITED STATES PATENT AND TRADEMARK OFFICE
CERTIFICATE OF CORRECTION

PATENT NO : 5,685,553
DATED : November 11, 1997
INVENTOR(S) : Weston Miles Wilcox et al.

It is certified that error appears in the above-identified patent and that said Letters Patent is hereby corrected as shown below:

Column 11, line 19, after "included" cancel "without" and substitute therefor --within--.

Signed and Sealed this

Twenty-fourth Day of March, 1998

Attest:

BRUCE LEHMAN

Attesting Officer

Commissioner of Patents and Trademarks